May 7, 1968    J. C. LAWRENCE ET AL    3,381,378
DENTAL DRILL ASSEMBLY
Filed March 31, 1966    2 Sheets-Sheet 1

INVENTORS:
JOHN C. LAWRENCE
HARRY FRANKS
BY Howson & Howson
ATTYS.

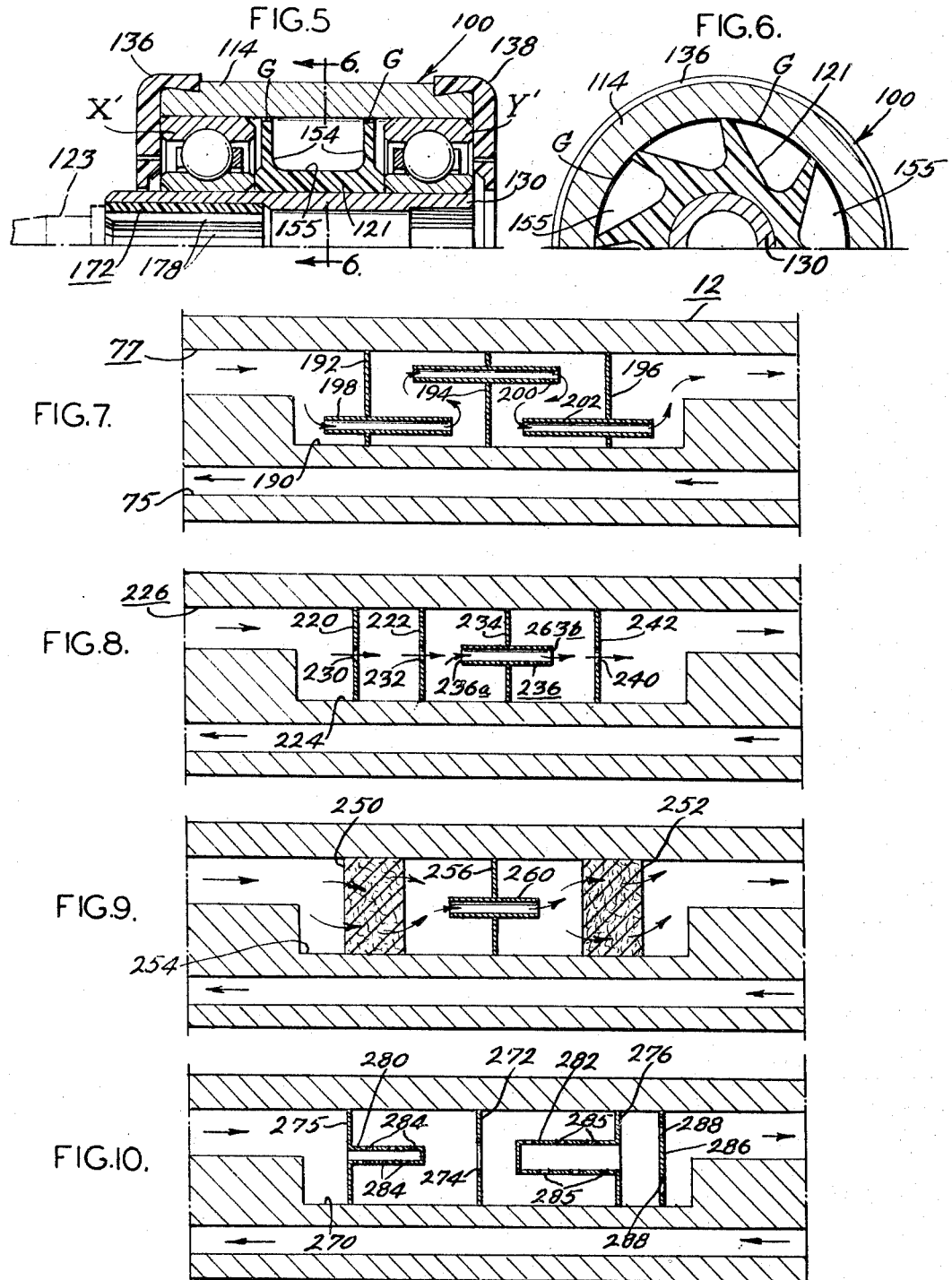

United States Patent Office 3,381,378
Patented May 7, 1968

3,381,378
DENTAL DRILL ASSEMBLY
John C. Lawrence, Calabasas, and Harry Franks, Chatsworth, Calif., assignors to SKF Industries, Inc., King of Prussia, Pa., a corporation of Delaware
Filed Mar. 31, 1966, Ser. No. 539,035
18 Claims. (Cl. 32—27)

ABSTRACT OF THE DISCLOSURE

A head assembly for a dental drill comprising a hollow housing, a shaft mounted centrally of the housing journalled at its opposite ends in bearings, a turbine mounted on the shaft and a collet at one end of the shaft for supporting a dental burr. The collet is designed to firmly grip and support the shank of the burr in one direction of rotation of the shaft and permits release of the burr from the collet when the burr is rotated in a direction opposite said one direction. To this end, the collet includes a plurality of circumferentially spaced, radially inwardly directed flexible fingers angularly pitched rearwardly relative to a radial line through the center of rotation of the burr.

---

Conventionally, the head assembly of a dental drill includes a pneumatically driven turbine for rotating the burr and a locking device for detachably holding the burr in place. Several drawbacks or disadvantages are note in these conventional head assemblies. For example, the assembly is comparatively expensive by reason of the precision design of the turbine and bearings and the comparatively complicated locking devices employed for holding the burr or drill bit. Further, since these head assemblies are comparatively small and comprise many small parts, it is readily apparent that the cost of making and assembling the head assembly is high. Furthermore it has been found that the bearing life is limited due to air leakage through the turbine which causes pressure on the bearing. This air leakage limits the speed of the turbine which rotates at relatively high speeds of approximately 200,000 r.p.m. and causes undue wear of the bearing necessitating replacement thereof after a comparatively short period of use. Since these assemblies are expensive as noted above, it can be readily appreciated that the life span of the bearing used to support the turbine is short, and the cost of maintaining these conventional head assemblies can also be high.

In view of the above, it is an object of the present invention to provide a comparatively simplified head assembly for a dental drilling instrument which is economical to manufacture, requires little maintenance and has an extended overall life. To this end, the head assembly includes a generally cylindrical tubular housing, a hollow shaft supported centrally of the housing on bearings and a lightweight plastic turbine assembly carried by the shaft. A collet is mounted at one end of the hollow shaft having a novel arrangement of radially inwardly directed resilient fingers which, upon rotation of the hollow shaft in one direction firmly grip the drill bit or burr mounted in the collet. When it is desired to remove the burr, it is simply rotated in the opposite direction whereby the fingers release the gripping force on the burr. The turbine is designed to minimize air thrust which limits speed of the bearings and causes excessive wear thereof and yet incorporates means for cooling the bearings during operation.

The head assembly of the present invention is comparatively simple and economical to make. Furthermore, the novel collet assembly provides a simple and effective means for holding the burr and the specific arrangement of the fingers securely centers and holds the burr in place. Further, the turbine wheel is made of a plastic material thereby minimizing noise and providing a more balanced assembly than conventional turbines composed of metallic materials. Moreover, the turbine design which incorporates fuly enclosed sides causes inlet and exhaust air to be ducted through inlet and exhaust ports rather than escape through the support bearings as in conventional high speed dental drill design and in this manner there is less windage and less air pressure against the ball bearing cage resulting in high speed and even longer bearing life. Further, the parts of the assembly are so economical and the life of the assembly is so extended that the entire assembly may be discarded when required.

With the foregoing in mind, an object of the present invention is to provide a head assembly for drilling instruments which is characterized by novel features of construction and arrangement which overcomes the drawbacks of presently known designs.

Another object of the present invention is to provide a head assembly for a dental drilling instrument or the like which is comprised of comparatively few parts, is economical to manufacture and easy to assemble.

A further object of the present invention is to provide a head assembly for a drilling instrument incorporating a novel collet assembly for accurately centering and firmly holding the burr in place during operation of the head assembly and which permits easy and rapid removal of the burr when desired or when necessary.

These and other objects of the present invention and the various features and details of the construction and operation of a drilling instrument in accordance with the present invention are hereinafter more fully set forth with reference to the accompanying drawings, where:

FIG. 5 is a fragmentary transverse sectional view of another embodiment of head assembly for a drilling instrument in accordance with the present invention;

FIG. 6 is a sectional view taken on lines 6—6 of FIG. 5;

FIG. 7 is a sectional view of the muffler taken on line 7—7 of FIG. 1; and

FIGS. 8, 9 and 10 are second, third and fourth embodiments of the muffler in accordance with the present invention.

Figure 1:
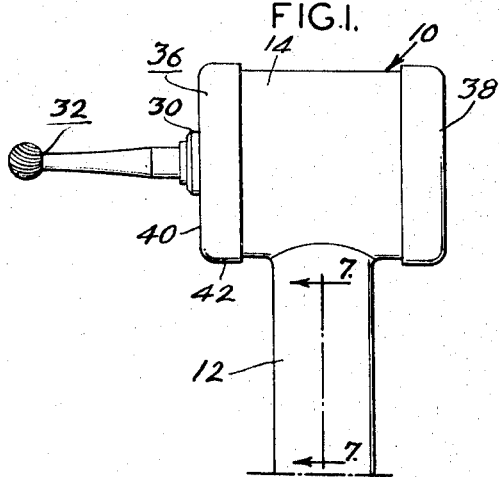
FIG. 1 is a side elevational view of the head assembly and a portion of a hand piece for a drilling instrument in accordance with the present invention.
Figure 2:
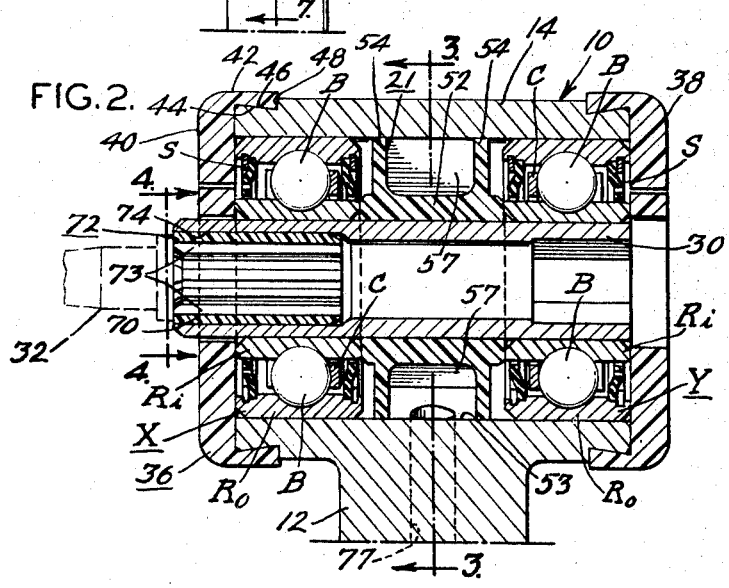
FIG. 2 is an enlarged transverse sectional view through the head assembly.

Referring now to the drawings and particularly to FIGS. 1 and 2 thereof, there is illustrated a head assembly 10 and a portion of a hand piece 12 for a dental drill constructed in accordance with the present invention. The head assembly 10 comprises a generally cylindrical hollow body portion or housing 14 and a rotatably mounted shaft 30 disposed centrally of the housing which detachably mounts at one end a dental drill burr 32 and which is rotatably supported axially of the housing and centrally thereof. In the present instance, the shaft 30 is supported by a pair of ball bearing assemblies X and Y disposed adjacent opposite axial ends of the housing. Each of these bearing assemblies is of generally conventional design and includes an inner ring $R_i$ mounted on the shaft 30, an outer ring $R_o$ mounted in the housing 14 and a plurality of balls B in the annular space between the rings. Each bearing assembly further includes a cage C for guiding and spacing the balls and end seals S adjacent opposite axial ends of the annular space to serve the normal function of retaining lubricant in the bearings.

As best illustrated in FIGS. 1 and 2, the head assembly further includes a pair of detachable cap members 36 and 38 adapted to be held in place over open opposite axial ends of the housing 14. As illustrated, both caps are of generally the same configuration, the cap 36 including a generally disc-like face portion 40 having a circumferentially extending axially directed lip 42 which has an outwardly diverging inner face or surface 44 which in the assembled relation is adapted to snap over a tapered surface 46 on the exterior of the housing, the tapered surface 46 terminating in a shoulder 48 against which the lip 42 abuts. The cap which is preferably made of a resilient flexible material, such as plastic, may then be snapped in place easily and removed when desired to inspect or replace elements of the head assembly.

Figure 3:
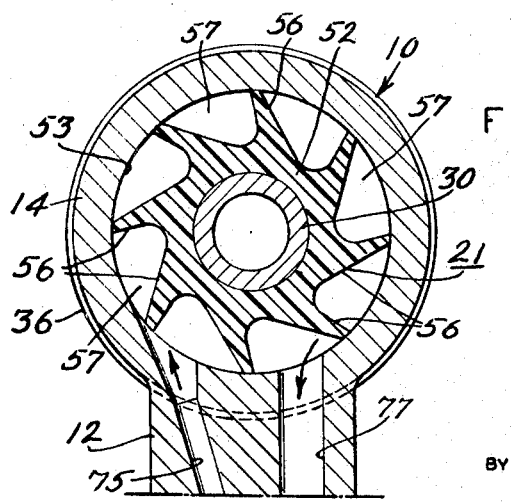
FIG. 3 is an enlarged sectional view taken on lines 3—3 of FIG. 2.

The turbine 21 is mounted on the shaft 30 centrally thereof and includes a hub portion 52, a pair of circumferentially extending collars or flanges 54 at opposite axial ends of the hub portion 52 and a plurality of circumferentially spaced, radially extending, angularly pitched blades 56 defining pockets 57. The blades 56 are directed rearwardly relative to the direction of rotation so that a driving fluid such as air directed to the turbine chamber 53 effects rotation of the turbine in a clockwise direction with respect to FIG. 3, which in turn effects rotation of the burr. The turbine 21 is preferably made of the flexible, resilient material, such as plastic to minimize noise in the operation of the dental instrument. Furthermore, by this construction the turbine, as well as other plastic elements of the hand piece, may be made economically and in effect provide a disposable assembly. A further advantage of making the turbine out of plastic material is that a better balanced assembly is provided which in effect extends the life of the entire assembly considerably and particularly the bearings.

Figure 4:
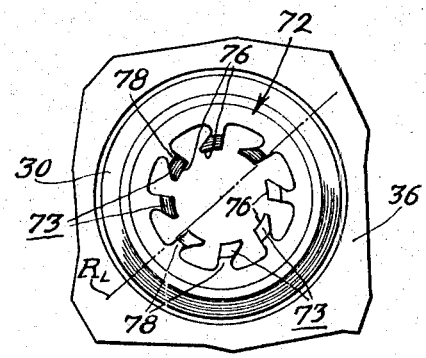
FIG. 4 is an enlarged fragmentary end view of the collet assembly as viewed from lines 4—4 of FIG. 2.

In accordance with the present invention, a collet assembly 72 is provided within which the burr may be detachably secured. This collet assembly 72, which is preferably made of a plastic material, is of generally cylindrical shape and of a size to snugly engage by means of a press fit in an enlarged bore 74 in one axial end of the shaft 30. The collet 72 has a plurality of radially inwardly directed, axially extending fingers 73 which are angularly pitched in a manner to firmly grip the shank 70 of the burr 32 in one direction of rotation of the shaft 30, the working direction of the burr 32. To this end the fingers 73 are angularly pitched rearwardly relative to the direction of rotation of the burr and more specifically with respect to FIG. 4, rearwardly directed relative to a radial line $R_L$ through the center of rotation of the burr. Each finger 73 as illustrated in FIG. 4, has a contoured face 76 conforming generally to the outer periphery of the shank 70 and has a reduced throat portion 78 remote from the tip to permit flexing of the fingers about this point.

The fingers 73 in their relaxed state, preferably define a circular opening of a size slightly smaller than the diameter of the shank portion 70 so that when it is desired to insert the burr 32, the shank portion 70 is rotated in a direction opposite to the working direction whereby the fingers 73 are pressed outwardly slightly to permit insertion of the burr. Now with the burr 32 in place during operation of the hand piece, the fingers 73 are biased in a direction to more firmly grip the shank 70 in a manner preventing slippage. After use, when it is desired to replace the burr, the burr 32 may simply be rotated in the opposite direction to flex the fingers 73 outwardly to permit release of the burr. This provides a simple and effective means for supporting the burr in the head assembly. The collet, which is self-locking, accurately centers and firmly holds the burr in place by means of the self-locking, lever spring-type fingers. This arrangement holds the burr more accurately centered than the conventional two-jaw collet.

In the present instance, the hand piece 12 is formed integrally with the head assembly 10. However, if desired, the hand piece and head assembly may be separate members adapted to be detachably secured. The hand piece 12 has an inlet channel or conduit 75 adapted to be connected to a suitable air supply source for driving the turbine 21 and an outlet channel or conduit 77 through which the driving fluid is exhausted. In the present instance the inner terminal portion of the inlet channel 75 is disposed at an angle to a plane through the central axis of the turbine to provide for maximum turbine speed and efficiency.

In view of the above, it is apparent that the present invention provides a novel head assembly for the dental instrument which is economical and easy to manufacture and assemble and is designed as a throw-away type cartridge. The head assembly is easy to assemble. For example, the turbine 21 is simply pressed onto the shaft 30 and then positioned interiorly of the housing 14. Bearing assemblies X and Y are then positioned over the shaft and interiorly of the housing from opposite axial ends thereof. Each bearing may be pre-loaded for example, by applying an adhesive to the inner and outer rings of the bearing assemblies and then applying an opposite axial force to the rings of each assembly so that when the adhesive sets, each of the bearings is preloaded the desired amount in an axial direction, and the collet 72 is press fitted into the enlarged axial end of the shaft 30. The caps 38 and 40 are then snapped over the open axial ends of the housing and the assembly is completed.

There is illustrated in FIGS. 5 and 6 another embodiment of head assembly 100 for a dental hand piece constructed in accordance with the present invention. This head assembly 100 is similar in overall structural arrangement to the previously described embodiment and includes a generally cylindrical hollow body portion or housing 114, a rotatably mounted shaft 130 in the housing 114 on which the turbine 121 is mounted and which detachably mounts at one end a dental burr 123 and is rotatably supported in the housing by a pair of ball bearing assemblies X' and Y' disposed adjacent opposite axial ends of the housing. These bearing assemblies are similar to the previously described assemblies and include inner and outer rings and a cage for spacing the balls. However, in the present instance, the bearing assemblies do not include seals.

Opposite axial ends of the housing 114 are enclosed by detachable cap members 136 and 138 having flanges with tapered inner faces to snap over the complementary tapered surfaces at axial ends of the housing in the manner described above in connection with the previous embodiment. A collet assembly 172 is mounted in one end of the shaft 130 and has a plurality of radially directed flexible fingers 178 for engaging the burr supported in the shaft during operation of the hand piece.

In the present instance means is provided for lubricating the bearing assemblies during operation. To this end, the circumferential edge of each turbine flange or side wall 154 is spaced slightly from the interior wall of the housing to provide a small gap G which provides communication between the pockets 155 of the turbine and the space interiorly of the housing wherein the bearings are mounted. Thus, if an oil-air mist is chosen for the driving fluid of the turbine, a predetermined small quantity of the air mist leaks through the gap G and into the bearings to lubricate the same. It is noted that the width of the gap is selected so that there is no deleterious side thrust on the bearings, but that a sufficient quantity does enter the bearings to lubricate the same. It has been found that this arrangement provides higher operating speeds, better bearing lubrication and longer bearing life.

Another feature of the dental hand piece of the present invention is the provision of a muffler in an exhaust channel of the hand piece to reduce noise. There is illustrated in FIG. 7 a cascaded muffler arrangement or system comprising an enlarged muffler chamber 190 in the exhaust channel 77 and in the present instance three axially spaced apart baffle walls 192, 194 and 196 in the chamber 190. Elongated tubular members 198, 200 and 202 are mounted in the walls. It is noted that the tubular members 198 and 202 in the inner and outer baffle walls 192 and 196 are axially aligned and that the inner terminal ends of the tubes are spaced inwardly and staggered relative to the tubular member 200 in the central baffle wall 194. By this arrangement, the fluid driving medium for the turbine passing through the exhaust channel follows a tortuous path through the various tubular members in the baffle walls.

There is illustrated in FIG. 8 another form of muffler system in accordance with the present invention, this system being generally designated as a reflection-type muffler system. In this system there is provided a pair of axially spaced baffle walls 220 and 222 adjacent one end of the enlarged muffler chamber 224 in the exhaust channel 226, the inner baffle walls having aligned central openings 230 and 232. The system further includes a third baffle wall 234 axially spaced downstream of the baffle walls 220 and 222 which mounts an elongated tubular member 236 therein having its inlet end 236a aligned with the openings 230 and 232 and its discharge end 236b aligned with the central opening 240 of a fourth baffle wall 242.

There is illustrated in FIG. 9 a damper-type resonance muffler system in accordance with the present invention. In this arrangement, a pair of baffle plugs 250 and 252 made of steel wool or fibers is mounted adjacent opposite axial ends of the enlarged muffler chamber 254 and central baffle wall 256 is mounted between the plugs 250 and 252 having an elongated axially extending tubular member 260 having open ends confronting the baffle plugs.

A fourth embodiment of muffler system in accordance with the present invention is illustrated in FIG. 10. This system is generally designated as a cascade-resonance type system and includes an enlarged muffler chamber 270 in the exhaust channel of the hand piece, a central baffle wall 272 having a central opening 274 therein, and inner and outer baffle walls 275 and 276 on opposite sides of the central wall 272, said inner and outer walls having a tubular finger 280 and 282 projecting toward the opening in the central wall. The fingers 280 and 282 have radially directed openings 284 and 285 therein. It is noted that the axial end of the outer finger 282 is longer than the inner finger 280 and that the cross sectional dimension of the outer finger is greater than the inner finger. The system further includes a discharge wall 286 having a pair of ports 288 which are radially spaced relative to the axis of the fingers 280 and 282.

From the foregoing it is readily apparent that the present invention provides several improvements in dental drill assemblies. For example, the head assembly is comprised of comparatively few parts which are easy and economical to assemble. This head assembly is also characterized by novel features of construction and arrangement including a collet which centers and firmly supports the burr by means of self-locking, cantilever spring-type elements and permits easy removal of the burr when desired and a turbine made of plastic material which minimizes noise and is more balanced than conventional turbine wheels. One embodiment of turbine design provides for a controlled amount of leakage for lubrication of the bearings. Additionally, in accordance with the present invention, the overall noise of the assembly is reduced considerably by incorporating a muffler in the outlet channel of the hand piece.

While particular embodiments of the present invention and various features and details of the construction and arrangement have been illustrated and described herein, it is not intended to limit the invention and changes and modifications may be made within the scope of the following claims.

We claim:

1. In a dental drill, a head assembly comprising a generally cylindrical hollow housing, a shaft mounted centrally of said housing, bearing means at opposite axial ends of said shaft rotatably supporting said shaft in said housing, a turbine mounted on said shaft and a collet at one end of said shaft for supporting a dental burr, said collet including a plurality of circumferentially spaced, radially inwardly directed flexible fingers angularly pitched rearwardly relative to a radial line through the center of rotation of the burr whereby the fingers firmly grip the shank of a burr in one direction of rotation of said shaft and the burr is released for removal from the collet upon rotation of the burr in a direction opposite said one direction.

2. In a dental drill as claimed in claim 1 wherein said turbine is made of a resilient material such as plastic.

3. In a dental drill as claimed in claim 1 wherein each of said bearing means comprises a ball bearing assembly including inner and outer rings, said inner ring being secured to said shaft and said outer ring being secured to said housing and each of said bearing assemblies being preloaded.

4. In a dental drill as claimed in claim 1 wherein said turbine includes a hub portion, a plurality of circumferentially spaced, radially extending angularly pitched blades and a pair of circumferentially extending flanges at opposite axial ends of the hub portion.

5. In a dental drill as claimed in claim 4 wherein the outer peripheral edge of said flanges engages the inner wall of said housing.

6. In a dental drill as claimed in claim 4, wherein the outer circumferential edge of said flange is spaced inwardly from the inner wall of said housing to provide a gap.

7. In a dental drill as claimed in claim 1 wherein said shaft is hollow and said collet is press fitted in an enlarged bore portion in one axial end of the shaft.

8. In a dental drill as claimed in claim 7 wherein the collet is made of a resilient material such as plastic.

9. In a dental drill as claimed in claim 1 including a pair of cap members adapted to be detachably secured over opposite axial ends of the housing.

10. In a dental drill as claimed in claim 1 wherein each finger has a contoured face conforming generally to the outer periphery of the shank of the burr and a reduced throat portion remote from the face to permit flexing of the fingers.

11. In a dental drill as claimed in claim 10 wherein the peripheral trace of the faces of the fingers in their relaxed state defines a circular opening of a size slightly smaller than the diameter of the shank of the burr.

12. In a dental drill, a head assembly comprising a generally cylindrical hollow housing, a shaft mounted centrally of said housing, bearing means at opposite axial ends of said shaft rotatably supporting said shaft in said housing, a turbine mounted on said shaft, a collet at one end of said shaft for supporting a dental burr, said collet including a plurality of circumferentially spaced, radially inwardly directed flexible fingers angularly pitched rearwardly relative to a radial line through the center of rotation of the burr whereby the fingers firmly grip the shank of a burr in one direction of said shaft and the burr is released for removal from the collet upon rotation of the burr in a direction opposite said one direction, a hand piece projecting from a side wall of the housing and means defining inlet and outlet channels in the hand piece for circulating a medium therethrough to drive the turbine.

13. In a dental drill as claimed in claim 12 wherein the inner terminal portion of the inlet channel is disposed at an angle to a plane through the central axis of the turbine.

14. In a dental drill as claimed in claim 12 including a muffler in one of said channels.

15. In a dental drill as claimed in claim 14 including an enlarged muffler chamber in said one channel and wherein said muffler comprises a plurality of axially spaced baffle walls in said chamber and an elongated tubular member mounted in each of said baffle walls in staggered array.

16. In a dental drill as claimed in claim 14 including an enlarged muffler chamber in said one channel and wherein said muffler comprises a pair of axially spaced baffle walls adjacent one end of the muffler chamber having aligned central openings and a third baffle wall axially spaced downstream of the pair of baffle walls, an elongated tubular member mounted in said third baffle wall and a fourth baffle wall having a central opening.

17. In a dental drill as claimed in claim 14 including an enlarged muffler chamber in said one channel and wherein said muffler comprises a pair of baffle plugs made of a porous material adjacent opposite axial ends of said muffler chamber, a central baffle wall between the plugs and an elongated tubular member mounted in said central wall having its open terminal ends confronting the baffle plugs.

18. In a dental drill as claimed in claim 14 including an enlarged muffler chamber in said one channel and wherein said muffler comprises a central baffle wall having a central opening therethrough, inner and outer baffle walls on opposite sides of the central wall, a first tubular finger on said inner wall projecting toward said central wall having a plurality of openings therein and a second finger mounted on said outer wall projecting toward said central wall having a plurality of openings therein.

References Cited

UNITED STATES PATENTS

| | | | |
|---|---|---|---|
| 3,009,249 | 11/1961 | Helm | 32—27 |
| 3,070,381 | 12/1962 | Sattir | 32—27 |
| 3,074,167 | 1/1963 | Turchi | 32—27 |
| 3,171,506 | 3/1965 | Hald | 181—57 X |
| 3,314,153 | 4/1967 | Maurer | 32—27 |

LOUIS G. MANCENE, *Primary Examiner.*

C. R. WENTZEL, *Assistant Examiner.*